United States Patent
Gulati et al.

(10) Patent No.: US 11,662,211 B2
(45) Date of Patent: May 30, 2023

(54) PACKAGE ON PACKAGE MEMORY INTERFACE AND CONFIGURATION WITH ERROR CODE CORRECTION

(71) Applicant: Texas Instruments Incorporated, Dallas, TX (US)

(72) Inventors: Rahul Gulati, Bangalore (IN); Aishwarya Dubey, Plano, TX (US); Nainala Vyagrheswarudu, Bangalore (IN); Vasant Easwaran, Bangalore (IN); Prashant Dinkar Karandikar, Bangalore (IN); Mihir Mody, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/983,437

(22) Filed: Aug. 3, 2020

(65) Prior Publication Data

US 2020/0363210 A1      Nov. 19, 2020

Related U.S. Application Data

(63) Continuation of application No. 16/114,419, filed on Aug. 28, 2018, now Pat. No. 10,767,998, which is a (Continued)

(30) Foreign Application Priority Data

Feb. 7, 2014   (IN) ............................. 583/CHE/2014

(51) Int. Cl.
    *G01C 21/20*    (2006.01)
    *G06F 11/10*    (2006.01)

(52) U.S. Cl.
    CPC ............ *G01C 21/206* (2013.01); *G06F 11/10* (2013.01); *G06F 2201/845* (2013.01)

(58) Field of Classification Search
    CPC .. G06F 2201/845; G06F 11/10; G01C 21/206
    See application file for complete search history.

(56) References Cited

U.S. PATENT DOCUMENTS

| 8,560,927 B1 | 10/2013 | Pagiamtzis et al. |
| 2005/0005212 A1 | 1/2005 | Ghameshlu et al. |

(Continued)

*Primary Examiner* — Kyle Vallecillo
(74) *Attorney, Agent, or Firm* — Mandy Barsilai Fernandez; Frank D. Cimino

(57) ABSTRACT

Information communication circuitry, including a first integrated circuit for coupling to a second integrated circuit in a package on package configuration. The first integrated circuit comprises processing circuitry for communicating information bits, and the information bits comprise data bits and error correction bits, where the error correction bits are for indicating whether data bits are received correctly. The second integrated circuit comprises a memory for receiving and storing at least some of the information bits. The information communication circuitry also includes interfacing circuitry for selectively communicating, along a number of conductors, between the package on package configuration. In a first instance, the interfacing circuitry selectively communicates only data bits along the number of conductors. In a second instance, the interfacing circuitry selectively communicates data bits along a first set of the number of conductors and error correction bits along a second set of the number of conductors.

20 Claims, 6 Drawing Sheets

Related U.S. Application Data continuation of application No. 14/587,878, filed on Dec. 31, 2014, now Pat. No. 10,089,172.

(56) References Cited

U.S. PATENT DOCUMENTS

| | | | |
|---|---|---|---|
| 2012/0182821 A1* | 7/2012 | Perego | G11C 8/00 365/230.01 |
| 2012/0290901 A1* | 11/2012 | Kong | G06F 11/1048 714/781 |
| 2014/0223128 A1 | 8/2014 | Staudenmaier et al. | |
| 2015/0067448 A1 | 3/2015 | Son et al. | |

* cited by examiner

US 11,662,211 B2

PACKAGE ON PACKAGE MEMORY INTERFACE AND CONFIGURATION WITH ERROR CODE CORRECTION

CROSS-REFERENCES TO RELATED APPLICATIONS

The present application is a continuation of and claims priority to U.S. patent application Ser. No. 16/114,419, filed on Aug. 28, 2018, which claims priority to U.S. patent application Ser. No. 14/587,878, filed on Dec. 31, 2014 (now U.S. Pat. No. 10,089,172), which claims priority to, the benefit of the filing date of, and hereby incorporates herein by reference, India Provisional Patent Application 583/CHE/2014, entitled "ENSURING DATA INTEGRITY FOR POP MEMORY USAGE IN FUNCTIONAL SAFETY CRITICAL APPLICATIONS WITH ASIL COMPLIANCE NEEDS," and filed Feb. 7, 2014.

STATEMENT REGARDING FEDERALLY SPONSORED RESEARCH OR DEVELOPMENT

Not Applicable.

BACKGROUND OF THE INVENTION

The preferred embodiments relate to circuits with package on package (PoP) memory interfaces, as well as configurations including the PoP memory interface and coupled memory.

By way of background, FIG. 1 illustrates a cross-sectional side view of an integrated circuit PoP designated generally at 10. The configuration as shown in FIG. 1 is consistent with the prior art, but notably the preferred embodiments also are suitable for implementing in a same configuration, albeit with greater functionality and benefits as detailed later. By way of general introduction to both the prior art and the related packaging considerations of the preferred embodiments, therefore, PoP 10 has two or more integrated circuit packages 20 and 30 (also known as chips) stacked relative to one another, typically for saving space to serve application requirements where area or volume is constrained. For example, automobile applications in confined areas of a vehicle may call for PoP devices, as may other consumer devices, such as cell phones and cameras. In general, the overall dimensions of integrated circuit PoP, shown generally two dimensionally D1 by D2, but understood to include a third dimension D3 perpendicular to D1 and D2, typically occupy one cubic inch, or less.

Each device 20 and 30 includes at least one functional die 22 and 32, respectively, atop a respective substrate 24 and 34. The two (or more) stacked PoP devices 20 and 30 may serve comparable functions such as multiple memories, or in a mixed logic-memory stacking the devices may differ, such as having a System-On-A-Chip (SoC) processor as the lower device, with memory stacked on top of the SoC processor and providing electronic storage to the processor. Each functional die 22 and 32 is encapsulated in a respective cover 26 and 36. Each package 20 and 30 has a respective set of connectors, typically by way of a ball grid array (BGA) 28 and 38. BGA 28 allows electrical connections between packages 20 and 30, while BGA 38 allows connections between package 30 and additional lines, such as are typically on a printed circuit board (PCB). In any event, the stacked arrangement of the PoP configuration reduces the two-dimensional space needed as compared to arranging the two chips separately in a generally same two dimensional plane. Other PoP advantages include shorter track length in the connections between the stacked devices, thereby improving performance, such as increasing speed and noise resistance.

While PoP configurations are increasingly useful and provide benefits as described above, it has been observed in connection with the preferred embodiments that PoP configurations may provide limitations. Specifically, because of the confined volume created by PoP stacking, typically the number of pin connections between the stacked devices is limited, due to the layout of die on each stacked device and the stacked perimeter, as typically occupied by the BGA. One manner observed in which such pin limitations arises is the lack of support for data checking by memories manufactured for PoP applications. More particularly, as technology advances, there again arises a need for smaller devices where PoP might appear usable, but at the same time some environments and applications also are increasing the use of so-called "mission critical" data. For example, in contemporary automotive applications, data that formerly was not mission critical is evolving toward mission critical, as may be guided by manufacturer requirements or regulations, such as via Automotive Safety Integrity Level (ASIL). Consider the instance of video data for a vehicle backup camera; such data in some applications may not by itself be mission critical when used solely to depict an image to a vehicle operator, but as such data becomes used for vehicle control, such as controlling brakes, steering, or acceleration, the criticality of the data is considerably increased. Such mission critical data, by definition, requires assurances of greater if not absolute accuracy. In PCB layouts, some accuracy is sometimes achieved through the use of a single parity bit per byte (or other quantum) of data, or for greater accuracy, error code correction (ECC) bits are used, wherein multiple ECC bits are generated, typically by hashing a byte (or other quantum) of data. Either the parity bit or ECC bits are used to verify data that is simultaneously communicated with the parity/ECC, and in the instance of an error then correction of the error is facilitated. For PoP applications, however, memory manufacturers construct memories (e.g., low power double data rate memory—LPDDR2/3) with a limited number of pins, presumably due to the confined area of PoP technology. As a result, such memory does not support parity/ECC. Moreover, the prior art PoP memory interface also does not support parity/ECC, again presumably due to the space constraints of PoP stacking as well as the general availability of memory usable in PoP architectures.

Further with respect to the above, FIGS. 2a and 2b illustrate electrical block diagrams of the limitations in prior art PoP LPDDR2 memory and interfacing configurations. For example, FIG. 2a illustrates a 32-bit PoP external memory interface $PEMIF_1$ which, consistent with the typical commercially available 32-bit PoP memory $PMEM_1$ (e.g., SDRAM), provides only data pins D[31:0], but no additional error information. Similarly, FIG. 2b illustrates a 16-bit PoP external memory interface $PEMIF_2$ which, consistent with the typical commercially available 16-bit PoP memory $PMEM_2$, provides only data pins D[15:0] but no additional error information.

Given the preceding, the present inventors have identified potential improvements to the prior art, as are further detailed below.

BRIEF SUMMARY OF THE INVENTION

A preferred embodiment provides information communication circuitry, including a first integrated circuit for coupling to a second integrated circuit in a package on package configuration. The first integrated circuit comprises processing circuitry for communicating information bits, and the information bits comprise data bits and error correction bits, where the error correction bits are for indicating whether data bits are received correctly. The second integrated circuit comprises a memory for receiving and storing at least some of the information bits. The information communication circuitry also includes interfacing circuitry for selectively communicating, along a number of conductors, between the package on package configuration. In a first instance, the interfacing circuitry selectively communicates only data bits along the number of conductors. In a second instance, the interfacing circuitry selectively communicates data bits along a first set of the number of conductors and error correction bits along a second set of the number of conductors.

Numerous other inventive aspects and preferred embodiments are also disclosed and claimed.

DETAILED DESCRIPTION OF EMBODIMENTS

Figure 1:
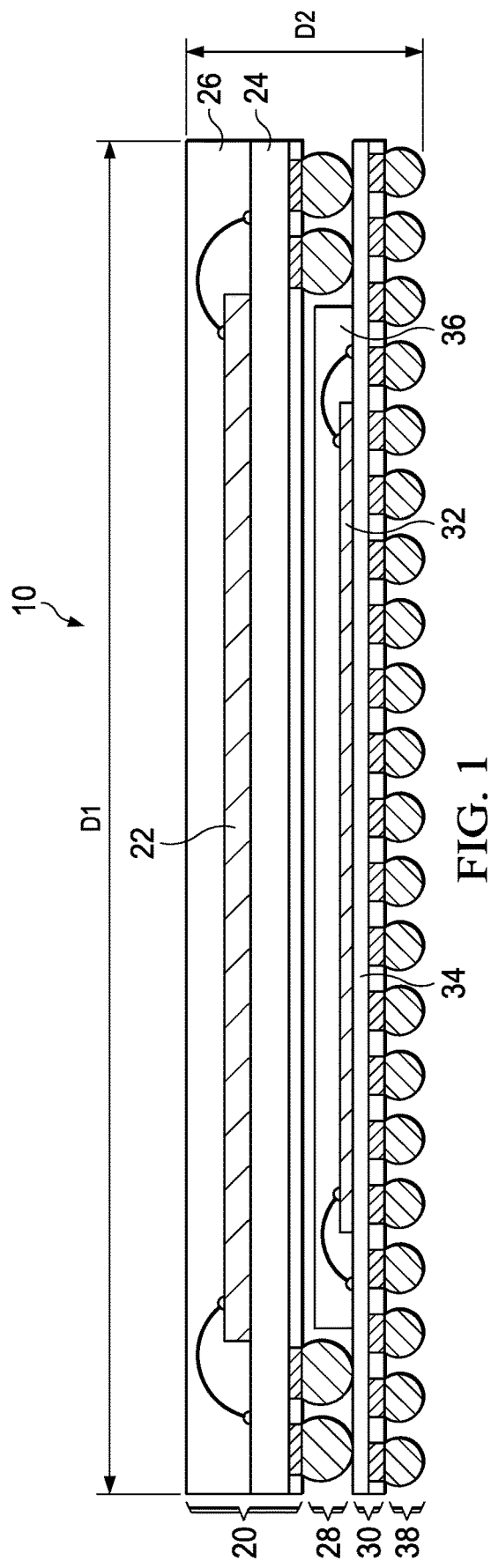
FIG. 1 illustrates a cross-sectional side view of a prior art integrated circuit package on package (PoP) configuration.
Figure 2A:
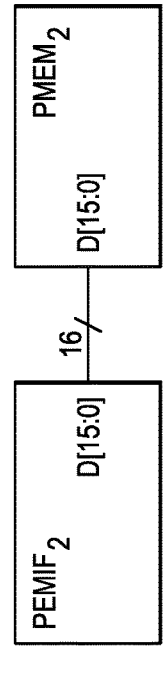
FIG. 2a illustrates a prior art 32-bit PoP external memory interface
Figure 2B:
FIG. 2b illustrates a prior art 16-bit PoP external memory interface.

FIGS. 1, 2a, and 2b were discussed above in the Background Of The Invention section of this document, and the reader is assumed to be familiar with that discussion.

Figure 3:
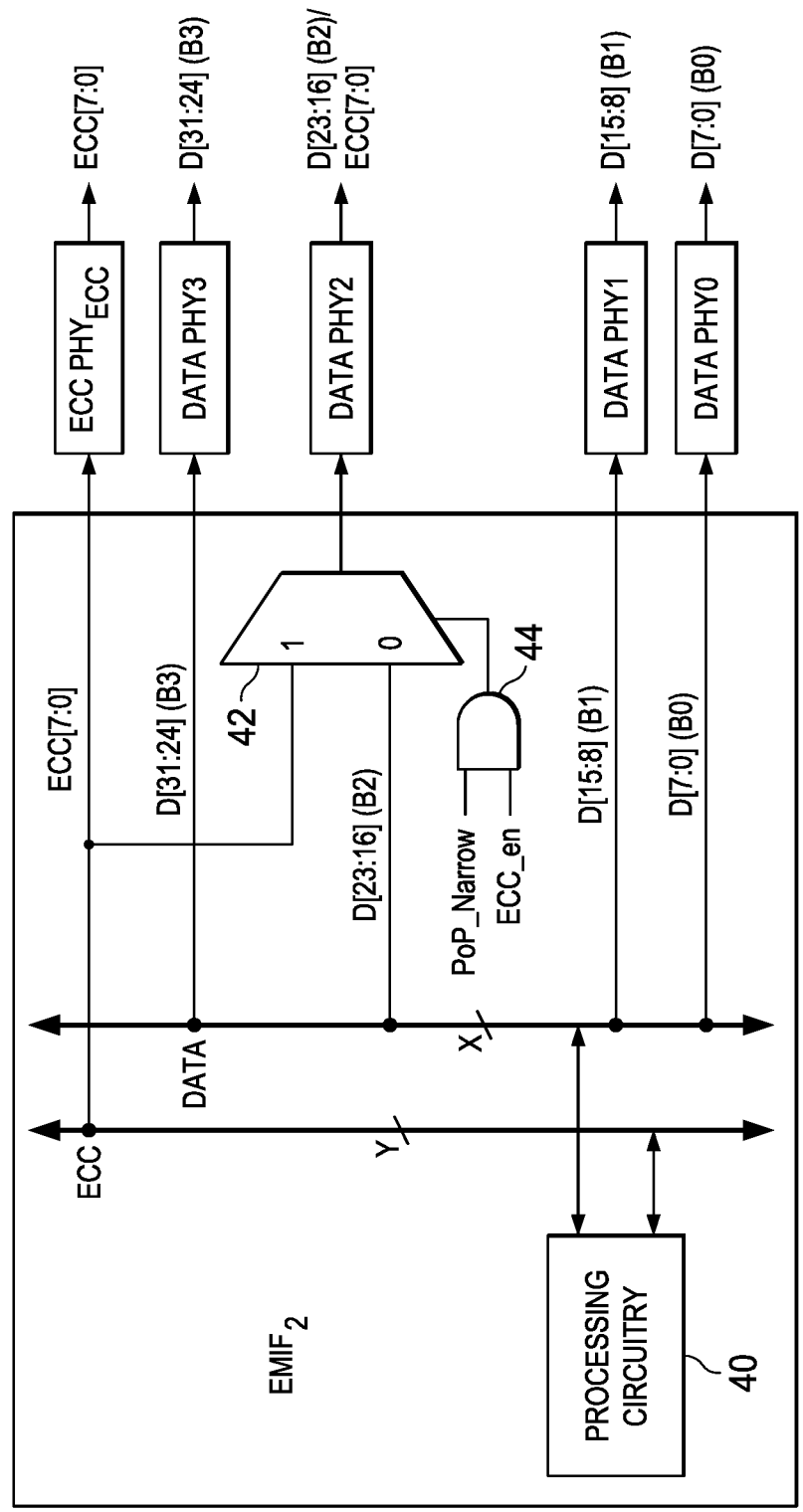
FIG. 3 illustrates a combined block and schematic view of an external memory interface in accordance with a preferred embodiment.

FIG. 3 illustrates a combined block and schematic view of an external memory interface $EMIF_2$ in accordance with a preferred embodiment. Interface $EMIF_2$ communicates information, including DATA and ECC for that DATA, to a memory, the latter of which is shown in later Figures. Interface $EMIF_2$ may be part of a larger memory interface with physical connectors (e.g., having one or more pins) beyond those shown and discussed below. For example, interface $EMIF_2$ may be part of a circuit, such as a processor, including a microprocessor or digital signal processor, that includes other connectors as understood by one skilled in the art. Such other connectors, however, are neither shown nor discussed so as to simplify the document. In any event and as detailed in this document, interface $EMIF_2$ overcomes limitations of the prior art in that it facilitates a combined PoP structure, as between interface $EMIF_2$ and standard prior art memories, that supports error checking such as ECC. In addition, interface $EMIF_2$ also may be used in non-PoP configurations, for example with one or more memories located on a PCB.

In a preferred embodiment, interface $EMIF_2$ includes a number of physical connectors PHYx, where each such connector PHYx represents a number of bits/pins/conductors for interfacing with an external memory circuit or chip, such as various types of SDRAM including LPDDR2/3 memory chips. For sake of example, each physical connector PHYx provides 8 bits (i.e., a byte) of information, although other sized data quantities could be represented, including a single connector/pin per bit. Nominally, interface $EMIF_2$ includes four such connectors for DATA, namely, DATA PHY0, DATA PHY1, DATA PHY2, and DATA PHY3, and one such connector for ECC, namely, ECC $PHY_{ECC}$. In this sense, therefore, the external connectors of interface $EMIF_2$ appear the same as a prior art non-PoP (e.g., PCB) interface, operable to connect to a memory that supports four bytes of DATA and one byte of ECC, and indeed interface $EMIF_2$ also may serve such a role. As detailed below, however, interface $EMIF_2$ also may serve PoP configurations, preferably including a 16-bit PoP with ECC arrangement, or a 32-bit PoP without ECC arrangement.

Within interface $EMIF_2$ are shown an ECC bus and a DATA bus, and interface $EMIF_2$ further includes Processing Circuitry 40 coupled to each such bus, to illustrate that the device (e.g., processor), including or communicating via $EMIF_2$, permits Processing Circuitry 40 to process up to X bits of DATA (e.g., X=32) and Y bits of ECC (e.g., Y=8 or less). The lowest first and second DATA bytes B0 (i.e., D[7:0]) and B1 (i.e., D[15:8]) of the DATA bus are connected to respective physical connectors DATA PHY0 and DATA PHY1, and the fourth DATA byte B3 (i.e., D[31:24]) is connected to physical connector DATA PHY3. The third DATA byte B2 (i.e., D23:16), however, is connected as a first input to a multiplexer 42. The sole ECC byte ECC[7:0] (or other number of bits in a different preferred embodiment) is connected to both physical connector ECC $PHY_{ECC}$ and the second input of multiplexer 42. The output of multiplexer 42 is connected to the physical connector DATA PHY2. The control input of multiplexer 42 is connected to the output of an AND gate 44, which for reasons detailed below has two input signals: (1) PoP_Narrow; and (2) ECC_en. In a preferred embodiment, these two input signals are internally generated (i.e., asserted or de-asserted), such as from register outputs, in response to software as may be run by Processing Circuitry 40 or the like, and consistent with the desired functionality described below.

Figure 4:
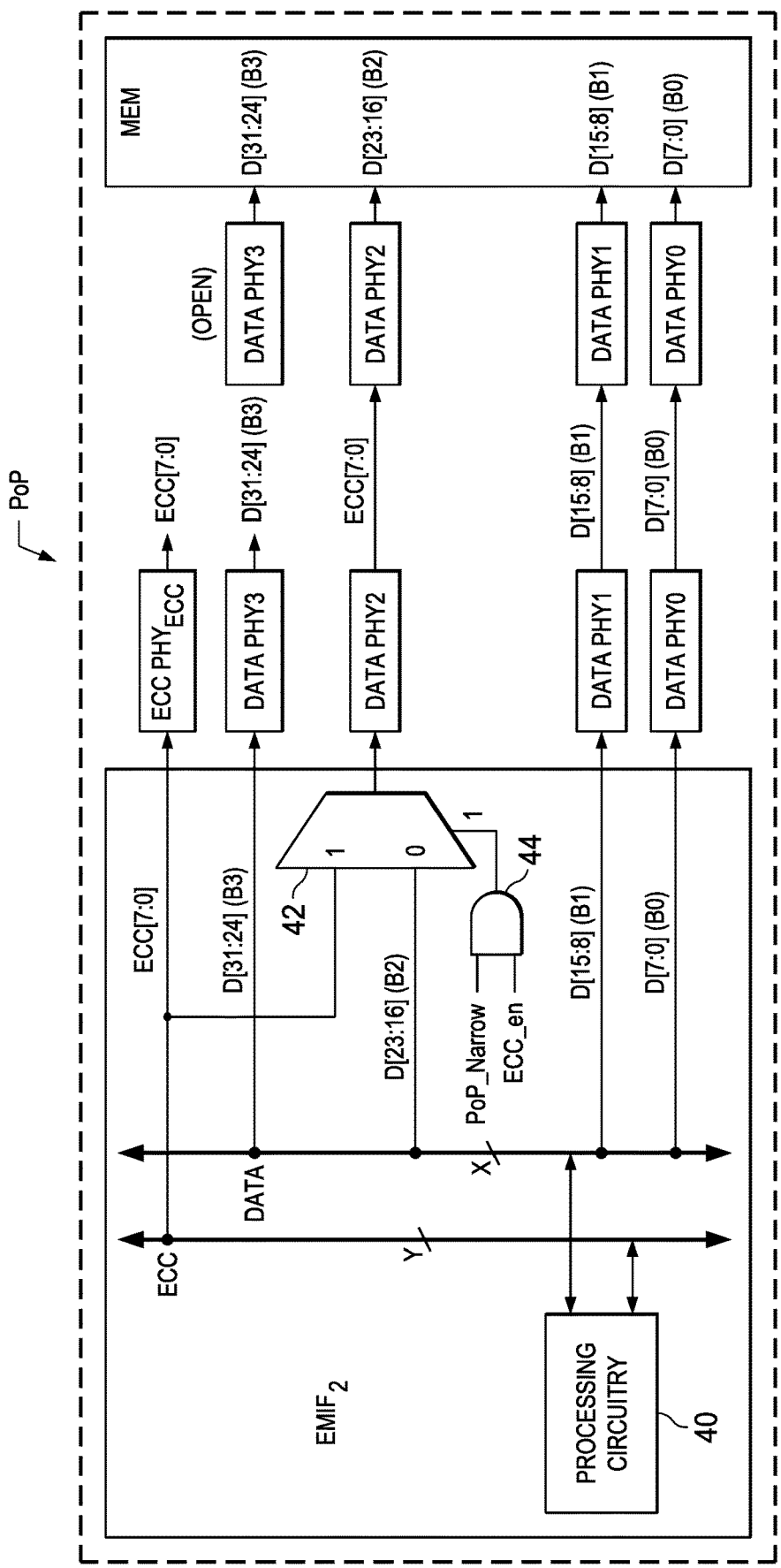
FIG. 4 illustrates a combined block and schematic view of a configuration including interface $EMIF_2$ of FIG. 3, when connected to a memory MEM for supporting 16-bit critical DATA in a PoP configuration.

FIG. 4 illustrates a combined block and schematic view of a configuration including interface $EMIF_2$ of FIG. 3, in a first instance, wherein interface $EMIF_2$ is connected to a memory MEM (e.g., 32-bit SDRAM) for supporting 16-bit critical data in a PoP configuration. By way of illustration, the PoP connectivity in general is shown by a dashed rectangle that includes interface $EMIF_2$ and memory MEM, as may be generally oriented physically in the manner shown and discussed above in FIG. 1. In FIG. 4, however, the preferred embodiment PoP configuration permits interface $EMIF_2$ to write, preferably at the same time, 16 DATA bits along with 8 bits of ECC, to memory MEM. At the outset, therefore, note that memory MEM is commercially available for PoP configurations, but such memory does not include dedicated ECC pins, presumably due to the space constraints of PoP considerations. In combination with the preferred embodiment interface $EMIF_2$, however, additional ECC protection is provided, as explored below.

In FIG. 4, the physical connectors from interface $EMIF_2$ of DATA PHY0 and DATA PHY1 of the first and second two DATA bytes B0 and B1, respectively, are connected to respective physical connectors on memory MEM. In addition, the physical connector from interface $EMIF_2$ of DATA PHY2, which recall is from the output of multiplexer 42, is connected to respective physical connector DATA PHY2 on memory MEM. Lastly, note that physical connector DATA PHY3 for the third byte on memory MEM is left open (i.e., disconnected from interface $EMIF_2$) so that, in the present configuration, any information at that interface constitutes "don't care" information.

The operation of the FIG. 4 configuration is now described. Because the configuration is intended to support PoP 16-bit with ECC, then the PoP_Narrow signal is asserted for the narrower option of 16 bits rather than 32 bits, and the ECC_en signal is asserted for including ECC information. In response, the output of AND gate 44 is asserted to that multiplexer 42 selects the ECC[7:0] information and outputs it to the physical connectors DATA PHY2 of both interface $EMIF_2$ and memory MEM. As a result, during a write of DATA from interface $EMIF_2$ to memory MEM, memory MEM receives, as its D[15:0], 16 bits of DATA from the interface $EMIF_2$ DATA bus; at the same time, memory MEM receives, as its D[23:16], 8 bits of ECC from the interface $EMIF_2$ ECC bus. Note further that while the various Figures and descriptions herein address the writing from interface $EMIF_2$ to memory MEM, the same preferred embodiment contemplates the reading of memory MEM by interface $EMIF_2$, in which case multiplexer 42 would serve as a demultiplexer, and the arrow directions depicting information flow in the various Figures would be reversed. In either event, therefore, the FIG. 4 configuration supports ECC communication, even in the PoP environment.

Figure 5:
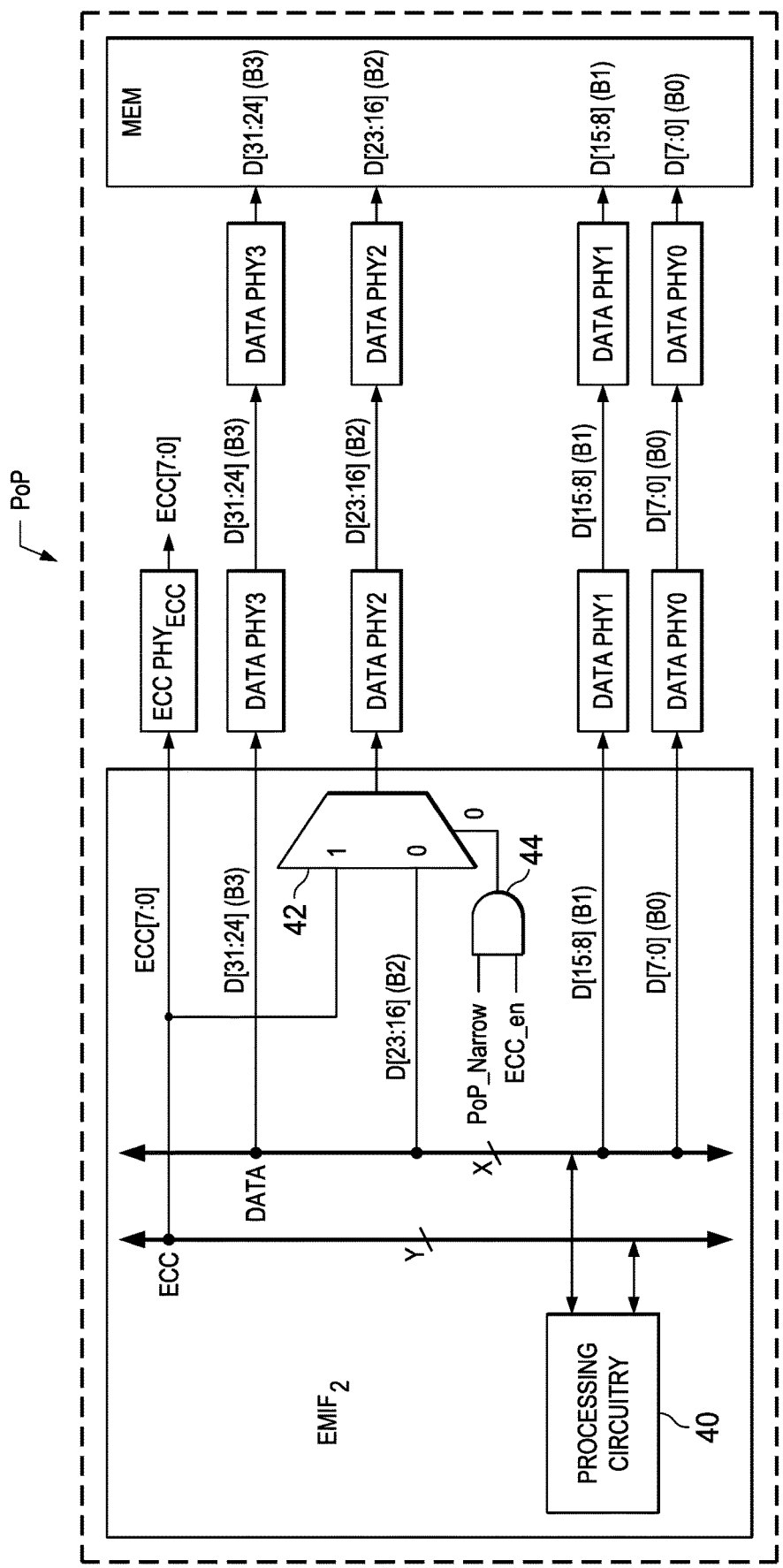
FIG. 5 illustrates a combined block and schematic view of a configuration including interface $EMIF_2$ of FIG. 3 when connected to a memory MEM for supporting 32-bit non-critical DATA in a PoP configuration.

FIG. 5 illustrates a combined block and schematic view of a configuration including interface $EMIF_2$ of FIG. 3 in a second instance, wherein interface $EMIF_2$ is connected to a memory MEM (e.g., 32-bit SDRAM) for supporting 32-bit non-critical data in a PoP configuration. Thus, the FIG. 5 PoP configuration permits interface $EMIF_2$ to simultaneously write (or read) 32 DATA bits, without ECC. Again, memory MEM is commercially available for PoP configurations. Also in FIG. 5, the physical connectors from interface $EMIF_2$ of all four data bytes, DATA PHY0, DATA PHY1, DATA PHY2, and DATA PHY3 are connected to respective physical connectors on memory MEM.

The operation of the FIG. 5 configuration is now described. Because the configuration is intended to support PoP 32-bit without ECC, then neither the PoP_Narrow signal nor the ECC_en signal is asserted. In response, the output of AND gate 44 is de-asserted, so that multiplexer 42 selects the D[23:16] of DATA and outputs it to the physical connectors DATA PHY2 of both interface $EMIF_2$ and memory MEM. As a result, during a write of DATA from interface $EMIF_2$ to memory MEM, memory MEM receives DATA from the $EMIF_2$ DATA bus at each of data inputs D[31:0]. In other words, fully 32 bits of DATA pass between interface $EMIF_2$ and memory MEM, without any ECC information. Thus, the same preferred embodiment interface $EMIF_2$ has been shown in FIGS. 4 and 5 to support PoP configurations, wherein one configuration (FIG. 4) supports ECC while another supports higher bandwidth (e.g., 32 bits versus 16 bits) without ECC.

Figure 6:
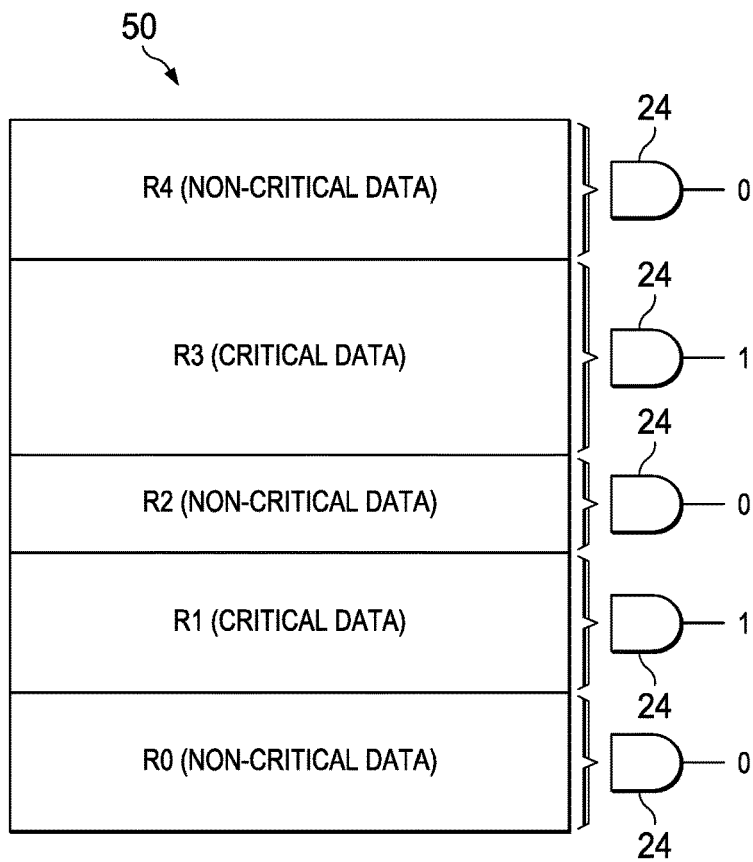
FIG. 6 illustrates a memory address space for demonstrating an additional preferred embodiment aspect in connection with dynamic switching to accommodate both critical and non-critical DATA.

FIG. 6 illustrates a memory address space 50 for demonstrating an additional preferred embodiment aspect in connection with dynamic switching of multiplexer 42 of FIG. 5, so as to accommodate both critical and non-critical DATA. Specifically, memory address space 50 is intended to illustrate a preferred mapping or storing of DATA within the address space addressable by interface $EMIF_2$, where as shown each region Rx of the space stores only critical or non-critical DATA but not a combination of the two. With this preferred embodiment partitioning of data storage, further in the preferred embodiment the FIG. 5 PoP configuration may achieve ECC protection in one instance for either the critical DATA regions R1 and R3, 16 bits at a time, or non-ECC protection in a different instance for any of the non-critical DATA regions R0, R2, and R4, 32 bits at a time. For example looking to region R0 which stores non-critical DATA, in the instance when interface $EMIF_2$ is communicating (e.g., writing) this non-critical DATA to memory MEM, then as indicated graphically in FIG. 6 to the right of that region, AND gate 44 is de-asserted, so that multiplexer 42 selects D[23:16] and outputs that byte B2 of DATA to the DATA PHY2 physical connectors of interface $EMIF_2$ and memory MEM; at the same time, interface $EMIF_2$ communicates the other three DATA bytes B0, B1, and B3 on respective connectors PHY0, PHY1, and PHY3. In this instance, therefore, 32 bits of non-critical DATA are communicated without ECC, but in a PoP configuration. To the contrary, however, and for example looking to region R1 which stores critical DATA, when interface $EMIF_2$ is communicating (e.g., writing) this critical DATA to memory MEM, then as indicated graphically in FIG. 6 to the right of that region, AND gate 44 is asserted, so that multiplexer 42 selects ECC[7:0] and outputs that information to the DATA PHY2 physical connectors of interface $EMIF_2$ and memory MEM; at the same time, interface $EMIF_2$ writes the lower two DATA bytes B0 and B1 (and B3 is a don't care). In this instance, therefore, 16 bits of critical DATA are communicated, along with ECC, in a PoP configuration. Thus, FIG. 6 further demonstrates that the FIG. 5 configuration supports dynamic switching so as to communicate either ECC or non-ECC protected DATA, in a PoP configuration.

Figure 7:
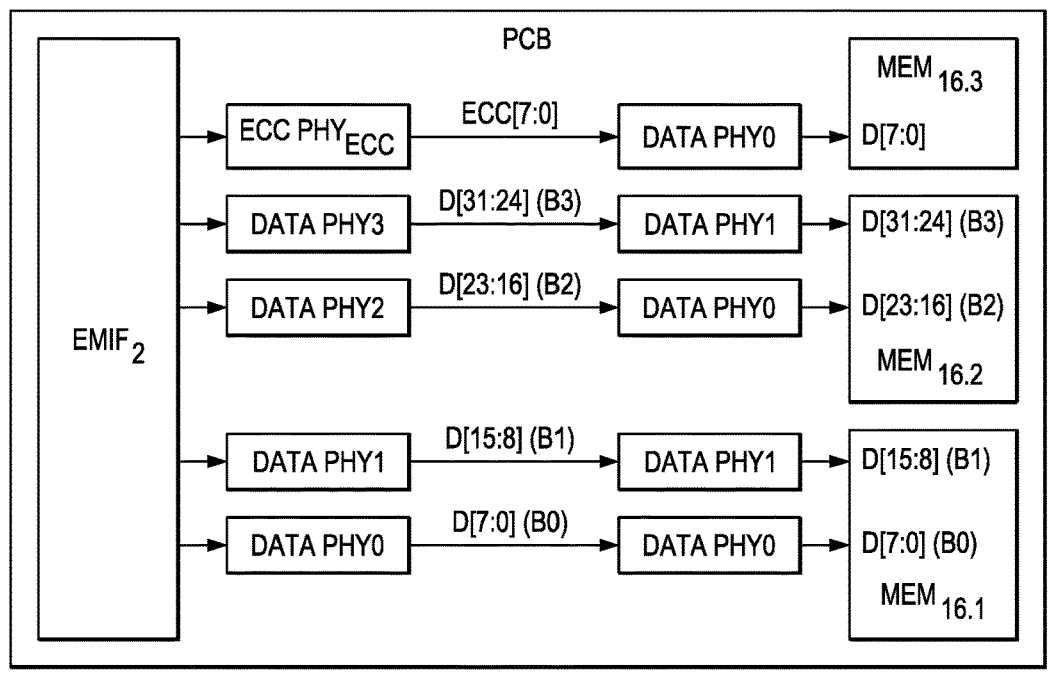
FIG. 7 illustrates an electrical block diagram of interface $EMIF_2$ in a non-PoP configuration supporting 32-bit DATA with ECC, and using two 16-bit memories $MEM_{16.1}$ and $MEM_{16.2}$, and a third 16-bit (or 8-bit) memory $MEM_{16.3}$ for ECC.

FIG. 7 illustrates an electrical block diagram of interface $EMIF_2$ in a non-PoP (e.g., PCB) configuration that supports 32-bit DATA with ECC, using two 16-bit memories $MEM_{16.1}$ and $MEM_{16.2}$ for DATA, and a third 16-bit (or 8-bit) memory $MEM_{16.3}$ for ECC. First, note that for sake of simplification, the internal schematic items of interface $EMIF_2$ shown and discussed above are eliminated from the Figure. Further in FIG. 7, the lower two DATA bytes from interface $EMIF_2$ are connected to communicate two bytes to 16-bit memory $MEM_{16.1}$, and the upper two DATA bytes from interface $EMIF_2$ are connected to communicate two bytes to 16-bit memory $MEM_{16.2}$. Further, the 8 bits from the physical connector ECC $PHY_{ECC}$ of interface $EMIF_2$ are connected to 8 bits in third memory $MEM_{163}$. Thus, in the earlier PoP configuration preferred embodiments wherein the physical connector ECC PHY$_{ECC}$ of interface EMIF$_2$ is unused, in the FIG. 7 preferred embodiment that additional connector provides support for non-PoP configurations. The FIG. 7 preferred embodiment configuration, therefore, demonstrates that interface EMIF$_2$ also may be used to support 32 DATA bits plus ECC, preferably in a non-PoP configuration, because the number of memory chips involved is likely to exceed the constrains of PoP configurations.

Figure 8:
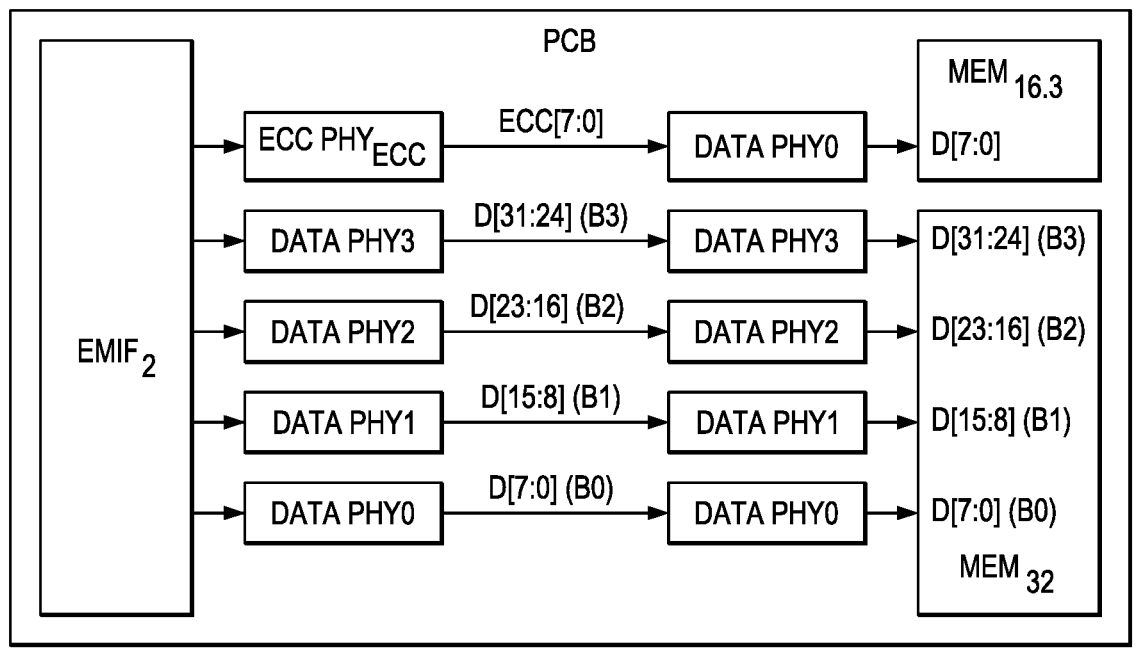
FIG. 8 illustrates an electrical block diagram of interface $EMIF_2$ in another non-PoP (e.g., PCB) configuration, which in FIG. 8 again supports 32-bit DATA with ECC, but here using a single 32-bit memory $MEM_{32}$ for DATA, along with again a 16-bit (or 8-bit) memory $MEM_{16.3}$ for ECC.

FIG. 8 illustrates an electrical block diagram of interface EMIF$_2$ in another non-PoP (e.g., PCB) configuration, which in FIG. 8 again supports 32-bit DATA with ECC, but here using a single 32-bit memory MEM$_{32}$ for DATA, along with again a 16-bit (or 8-bit) memory MEM$_{16.3}$ for ECC. In FIG. 8, therefore, each DATA byte from interface EMIF$_2$ is connected to a respective DATA byte position in memory MEM$_{32}$, that is, the first DATA byte from interface EMIF$_2$ connects to the first DATA byte in 32-bit memory MEM$_{32}$, the second DATA byte from interface EMIF$_2$ connects to the second DATA byte in 32-bit memory MEM$_{32}$, and so forth. Further, the 8 bits from the physical connector ECC PHY$_{ECC}$ of interface EMIF$_2$ are connected to 8 bits in memory MEM$_{16.3}$. The FIG. 8 preferred embodiment configuration, therefore, demonstrates that interface EMIF$_2$ also may be used to support 32 DATA bits plus ECC using, for the DATA, a single DATA memory chip, as opposed to the two DATA memory chips in FIG. 7. Further, again the physical connector ECC PHY$_{ECC}$ of interface EMIF$_2$, unused for PoP configurations, in FIG. 8 provides support for non-PoP configurations.

Figure 9:
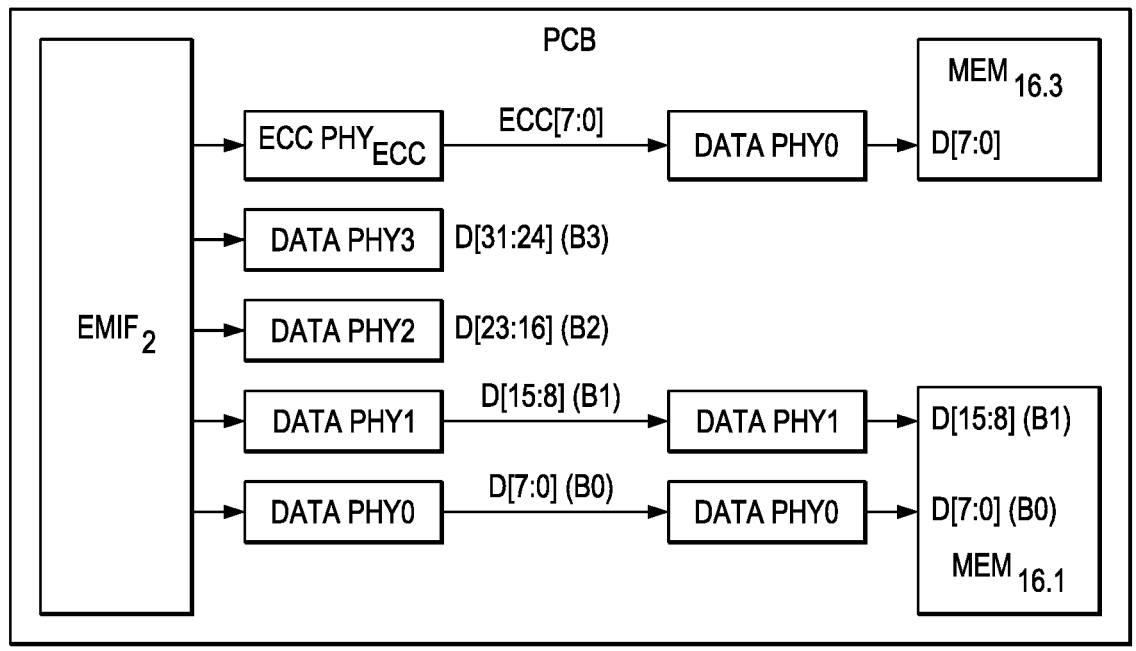
FIG. 9 illustrates an electrical block diagram of interface $EMIF_2$ in a non-PoP (e.g., PCB) configuration that supports 16-bit DATA with ECC, and using a single 16-bit memory $MEM_{16.1}$ for DATA and a single 16-bit (or 8-bit) memory $MEM_{16.3}$ for ECC.

FIG. 9 illustrates an electrical block diagram of interface EMIF$_2$ in a non-PoP (e.g., PCB) configuration that supports 16-bit DATA with ECC, and using a single 16-bit memory MEM$_{16.1}$ for DATA and a single 16-bit (or 8-bit) memory MEM$_{16.3}$ for ECC. The FIG. 9 preferred embodiment configuration demonstrates that interface EMIF$_2$ also may be used to support 16 DATA bits plus ECC, preferably in a non-PoP configuration. Additionally, once more, FIG. 9 demonstrates that the physical connector ECC PHY$_{ECC}$ of interface EMIF$_2$, unused for PoP configurations, provides support for non-PoP configurations.

From the above, various embodiments provide numerous improvements to the prior art. Such improvements include circuitry with an external memory interface that provides PoP memory configurations with available ECC support. Moreover, the preferred embodiments contemplate that a same interface can further support alternative functionality within a PoP configuration so that critical data has ECC support, while non-critical data does not, but the latter is afforded greater bandwidth (e.g., 32 bits) than the ECC supported data (e.g., 16 bits). Still further, the same preferred embodiment interface may support one or more non-PoP configurations. Moreover, various aspects have been described, and still others will be ascertainable by one skilled in the art from the present teachings. For example, while multiplexer 42 has been shown as included within the same integrated circuit that comprises Processing Circuitry 40, external glue logic may be used in an alternative embodiment. Thus, while various alternatives have been provided according to the disclosed embodiments, still others are contemplated. Given the preceding, therefore, one skilled in the art should further appreciate that while some embodiments have been described in detail, various substitutions, modifications or alterations can be made to the descriptions set forth above without departing from the inventive scope, as is defined by the following claims.

The invention claimed is:

1. A device comprising:
   processing circuitry with a first terminal and a second terminal;
   error code correction (ECC) bus coupled to the first terminal of the processing circuitry;
   data bus coupled to the second terminal of the processing circuitry;
   an ECC physical connector having an input coupled to the ECC bus;
   a multiplexer having a first input, a second input, and an output, the first input of the multiplexer coupled to the input of the ECC physical connector, and the second input of the multiplexer coupled to the data bus; and
   a data physical connector having an input coupled to the output of the multiplexer;
   wherein the processing circuitry, the ECC bus, the date bus, and the multiplexer are included in a same package of the device; and
   wherein the ECC physical connector and the data physical connector are configured to be coupled between circuitry internal to the package and circuitry external to the package.

2. A device comprising:
   processing circuitry with a first terminal and a second terminal;
   error code correction (ECC) bus coupled to the first terminal of the processing circuitry;
   data bus coupled to the second terminal of the processing circuitry;
   an ECC physical connector having a first terminal coupled to the ECC bus;
   a multiplexer having a first input, a second input, and an output, the first input of the multiplexer coupled to the first terminal of the ECC physical connector, and the second input of the multiplexer coupled to the data bus; and
   a data physical connector having a first terminal coupled to the output of the multiplexer;
   wherein the processing circuitry, the ECC bus, the data bus, and the multiplexer are included in a same package of the device;
   where the first terminal of the ECC physical connector couples to circuitry internal to the package, and a second terminal of the ECC physical connector is configured to be coupled to circuitry external to the package; and
   where the first terminal of the data physical connector couples to circuitry internal to the package, and a second terminal of the data physical connector is configured to be coupled to the circuitry external to the package.

3. The device of claim 1 wherein:
   the device further comprises a memory having an input; and
   the data physical connector has an output that is coupled to the input of the memory.

4. The device of claim 3 wherein the memory is connected as a package-on-package configuration.

5. The device of claim 2 wherein:
   the device further comprises a memory having an input; and
   the second terminal of the data physical connector is coupled to the input of the memory.

6. The device of claim 5 wherein the memory is connected as a package-on-package configuration.

7. The device of claim 1, wherein the ECC bus and the data bus are external to the processing circuitry.

8. The device of claim 1, wherein the ECC bus and the data bus are respectively coupled between the processing circuitry and the multiplexer.

9. The device of claim 1, wherein:
the input of the ECC physical connector couples to the circuitry internal to the package, and an output of the ECC physical connector is configured to be coupled to the circuitry external to the package; and
the input of the data physical connector couples to the circuitry internal to the package, and an output of the data physical connector is configured to be coupled to the circuitry external to the package.

10. The device of claim 1, wherein the ECC physical connector and the data physical connector couple between circuitry internal to the package and circuitry external to the package.

11. The device of claim 1, wherein:
the package is a first package;
the device further comprises a second package that includes a memory having an input; and
the data physical connector has an output that is coupled to the input of the memory.

12. The device of claim 1, wherein the output of the multiplexer is selected in response to an ECC selection signal and a width of a memory external to the package.

13. The device of claim 2, wherein the ECC bus and the data bus are external to the processing circuitry.

14. The device of claim 2, wherein the ECC bus and the data bus are respectively coupled between the processing circuitry and the multiplexer.

15. The device of claim 2, wherein the ECC physical connector and the data physical connector are configured to be coupled between circuitry internal to the package and circuitry external to the package.

16. The device of claim 2, wherein:
the package is a first package;
the device further comprises a second package that includes a memory having an input; and
the second terminal of the data physical connector is coupled to the input of the memory.

17. The device of claim 2, wherein the output of the multiplexer is selected in response to an ECC selection signal and a width of a memory external to the package.

18. The device of claim 2, wherein the device is an external memory interface EMIF2.

19. A device comprising:
processing circuitry with a first terminal and a second terminal;
error code correction (ECC) bus coupled to the first terminal of the processing circuitry;
data bus coupled to the second terminal of the processing circuitry;
an ECC physical connector having an input coupled to the ECC bus;
a multiplexer having a first input, a second input, and an output, the first input of the multiplexer coupled to the input of the ECC physical connector, and the second input of the multiplexer coupled to the data bus; and
a data physical connector having an input coupled to the output of the multiplexer;
wherein the processing circuitry, the ECC bus, the data bus, and the multiplexer are included in a first package of the device;
wherein the device further comprises a second package of the device that includes a memory having an input; and
wherein the data physical connector has an output that is coupled to the input of the memory.

20. A device comprising:
processing circuitry with a first terminal and a second terminal;
error code correction (ECC) bus coupled to the first terminal of the processing circuitry;
data bus coupled to the second terminal of the processing circuitry;
an ECC physical connector having an input coupled to the ECC bus;
a multiplexer having a first input, a second input, and an output, the first input of the multiplexer coupled to the input of the ECC physical connector, and the second input of the multiplexer coupled to the data bus; and
a data physical connector having an input coupled to the output of the multiplexer;
wherein the processing circuitry, the ECC bus, the data bus, and the multiplexer are included in a same package of the device;
wherein the output of the multiplexer is selected in response to an ECC selection signal and a width of a memory external to the package.

* * * * *